United States Patent [19]

Newman

[11] Patent Number: 5,437,422
[45] Date of Patent: Aug. 1, 1995

[54] RAILWAY SIGNALLING SYSTEM

[75] Inventor: Greogory D. Newman, Chippenham, United Kingdom

[73] Assignee: Westinghouse Brake and Signal Holdings Limited, United Kingdom

[21] Appl. No.: 15,144

[22] Filed: Feb. 9, 1993

[30] Foreign Application Priority Data

Feb. 11, 1992 [GB] United Kingdom ................. 9202830

[51] Int. Cl.$^6$ .............................................. B61L 27/04
[52] U.S. Cl. .................................... 246/5; 246/182 R; 246/187 A
[58] Field of Search .................... 246/3, 4, 5, 62, 62 R, 246/62 C, 62 A, 122 R, 167 R, 182 R, 187 R, 187 A

[56] References Cited

U.S. PATENT DOCUMENTS

| | | | |
|---|---|---|---|
| 4,179,739 | 12/1979 | Virnot | 246/3 X |
| 4,351,504 | 9/1982 | Frielinghaus | 246/122 R X |
| 4,735,383 | 4/1988 | Corrie | 246/3 |
| 4,768,740 | 9/1988 | Corrie | 246/122 R X |
| 4,787,581 | 11/1988 | Dobler et al. | 246/122 R X |
| 4,863,123 | 9/1989 | Bernard et al. | 246/122 R |
| 4,974,259 | 11/1990 | Takahashi et al. | 246/122 R X |
| 5,129,605 | 7/1992 | Burns et al. | 246/5 |

Primary Examiner—Michael S. Huppert
Assistant Examiner—Scott L. Lowe
Attorney, Agent, or Firm—Welsh & Katz

[57] ABSTRACT

A railway signalling system comprising a control device for controlling the movements of railway vehicles on a railway track. The system includes a memory for storing data defining physical characteristics of the railway track and the locations of the vehicles, a first processor for processing the data stored in the memory to determine permissible movements of the vehicles, and a first interface for transmitting to the vehicles movement data defining the vehicles' permissible movements; and a protection unit carried by at least one of the vehicles for causing the vehicle to move under the control of the control device, comprising a second interface receiving the movement data relating to the vehicle, a second memory for storing geographical data defining physical characteristics of the railway track, a second processor for processing the movement data in dependence on the geographical data to determine an operating speed for the vehicle, and an operation unit for controlling the travel of the vehicle at the determined operating speed.

15 Claims, 4 Drawing Sheets

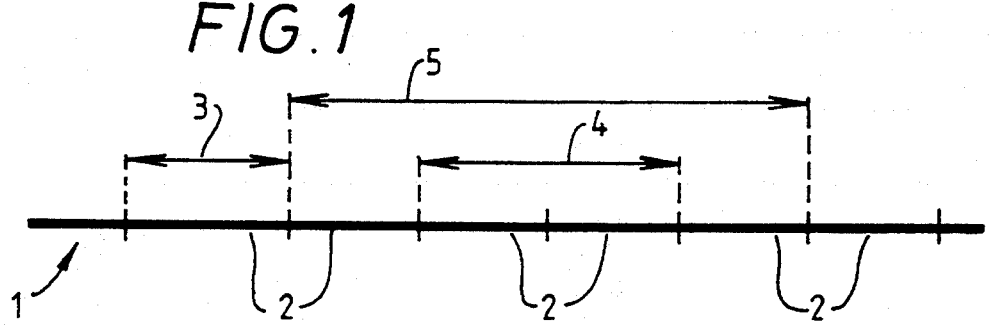
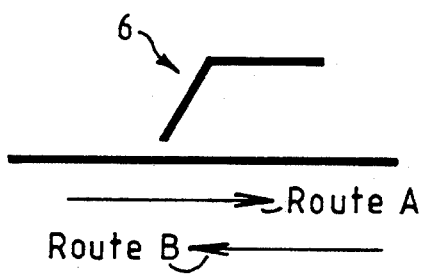
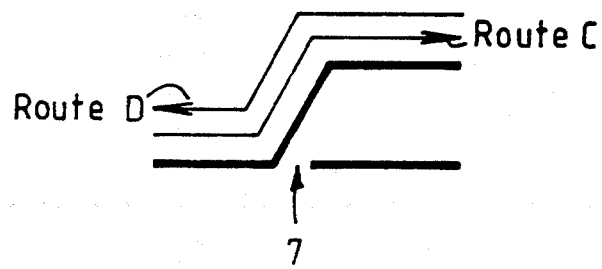
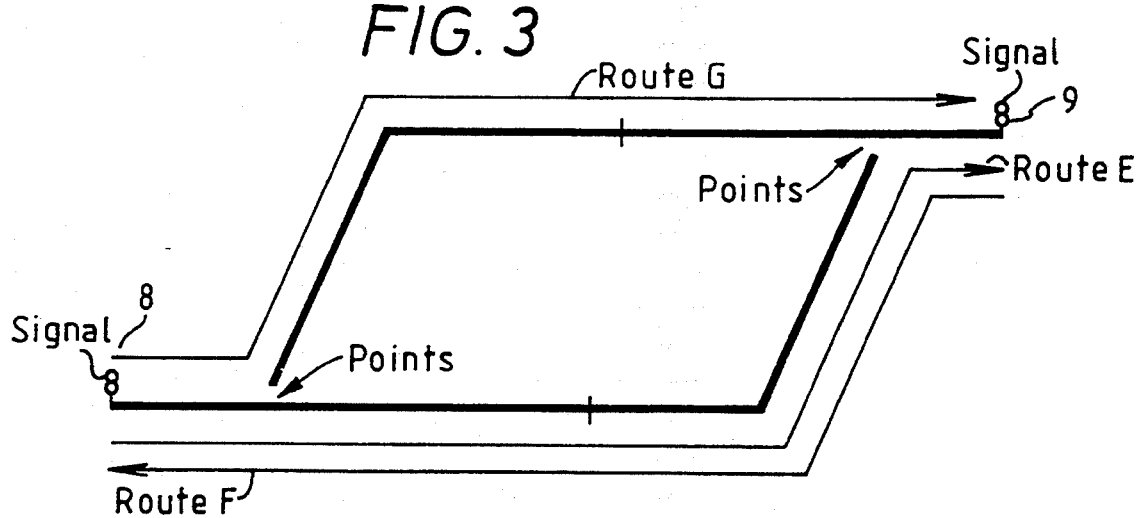
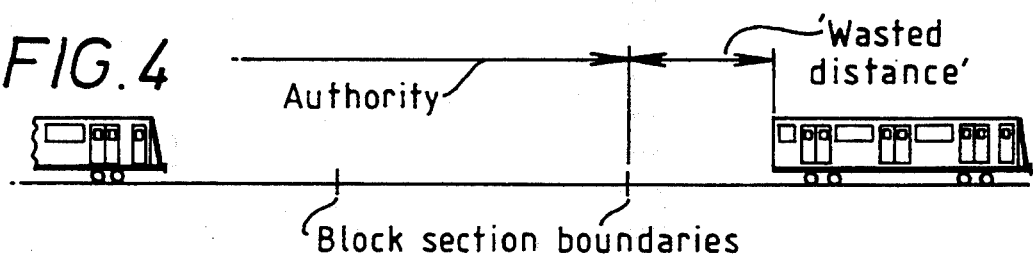

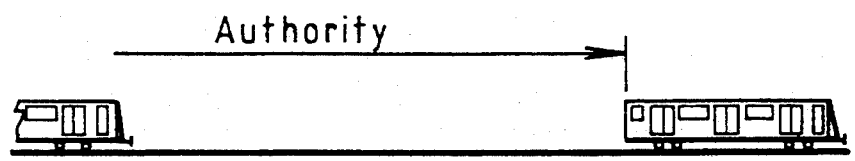
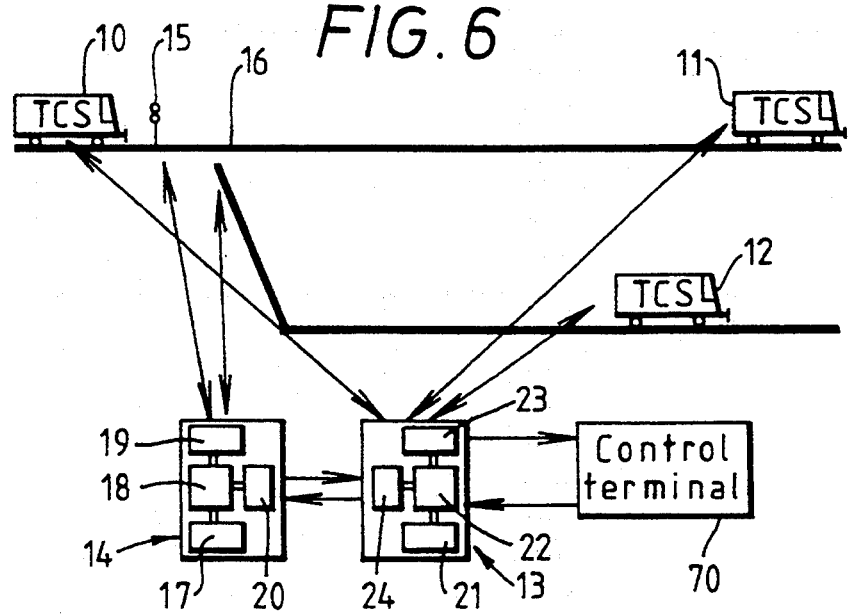
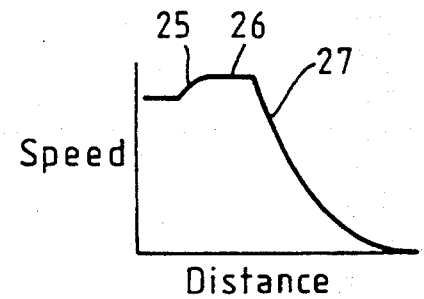
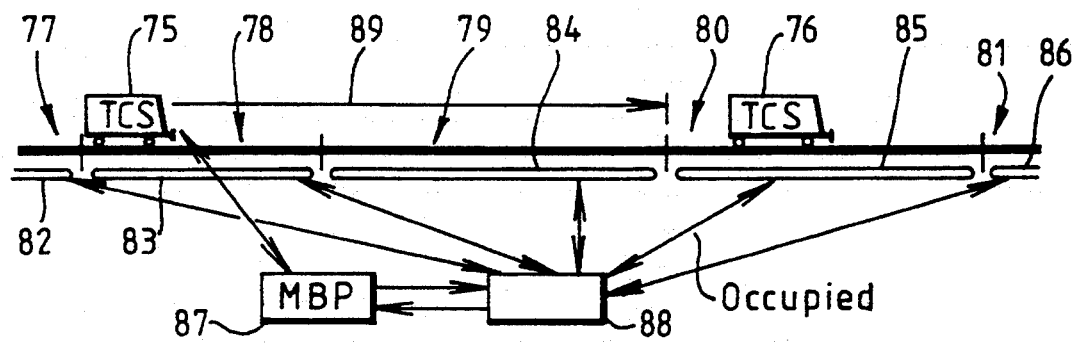

RAILWAY SIGNALLING SYSTEM

The present invention relates to signalling systems suitable for use in railways.

As the demands on public transport become greater, there is a need to increase the capacity of railways. One solution to this is to use shorter "headways" (headway is the time between the passage of one train and the next) to improve the performance of existing railways. This can be achieved by using "moving block" signalling, and according to the present invention moving block signalling can be "overlaid" on to an existing "fixed block" signalling system with resultant improvements in the capacity of the railway together with savings in equipment costs due to not having to replace any of the existing signalling equipment.

In a conventional "fixed block" system, trains travel on railways that are notionally divided into fixed "blocks". Each block comprises a section of railway track. These are normally defined physically by train detection apparatus such as track circuits, axle counters, position detectors and the like. "Routes", which may be followed by a train and which define the movements that a train may make through a system, include one or more adjacent blocks. Routes are defined for the convenience of operating a train service.

FIG. 1 illustrates blocks and routes. Referring to FIG. 1, a railway track 1 is divided into block sections 2. Routes 3, 4 and 5 may be defined by one or more block sections. The directions of routes over junctions are different depending on the lay of the points at the junction. The lay of the points, and hence the directions of the routes, are conventionally referred to as "normal" and "reverse", although at any junction these terms are allocated purely for convenience. There are four routes by which a train can pass over any junction, as shown in FIGS. 2a) and 2b). Referring to these Figures, points 6 are shown in a "normal" position and routes A and B may then be taken across the 3unction; points 7 are shown in a "reverse" position and routes C and D may then be taken across the junction.

A route is said to have a "start" or ("entry") location and a "finish" (or "destination") location and the path between the two is defined by the lay of any points in between. Routes' start and finish locations are generally located at signals on the railway. FIG. 3 shows three routes: E, F and G, between locations 8 and 9 spaced apart on a railway track. There are signals at locations 8 and 9. Although they traverse the same path between 8 and 9, routes E and F are distinct because they have different start and finish locations: route E starts at 8 but route F starts at 9. Although they have the same start and finish locations, routes E and G are distinct in that they traverse different paths.

For safety, it is conventional only to allow a train to proceed along the railway track if a route has been set for it, and then only as far as the line ahead of the train is clear. The route is "set" if the points are locked in the correct positions for the train to traverse that route and a route entry signal has been activated; this is known as the "route locking" level. Determining how far ahead the line is clear is generally done by checking that the block sections traversed in the route are clear of other trains; this is known as the "aspect" level. This is conventional in fixed block signalling.

In a fixed block system, the position of a train is regarded as lying in a block between two fixed points. These two points may be some distance apart and therefore the precision with which a train's position can be determined is limited by the size of the blocks. The limit of "movement authority" (LMA) (that is the distance to which a train is authorised to proceed along the track) given to a train which is following another is limited to the closest possible position of the train in front: the end closest of the occupied block to the following train. Thus the movement authority of the following train is updated in "granular chunks" as the followed train clears each block section. This fixed block system is shown in FIG. 4.

It is apparent from FIG. 4 that there is, in many cases, some wasted distance, being the distance between the tail end of the followed train and the rear end of the block in which it is known to lie. This wastage can be reduced in theory by reducing the length of each block section so that the train's position is known more precisely but in practice this becomes extremely expensive.

Another disadvantage of fixed block systems is that although it is readily apparent on plain line unidirectional track with no junctions which is the "following" train and which is the "followed" train, this is not so at junctions or when trains may move in either direction on a single section of track.

Also, a train's movement may not be restricted only by its LMA: there are properties of the railway such as gradients, curves, maximum line speed, speed restrictions and the like that affect the maximum safe speed of a train. These may differ depending on the route the train is to take.

GB 1 458 659 discloses a fixed block railway signalling system in which each block along the track may be subdivided by "track markers" which can be detected by vehicles travelling the track. A vehicle travelling along the track receives data defining the number of track markers in the whole blocks ahead of it which are unoccupied by other vehicles. A controlling unit may detect the number of blocks ahead of a vehicle in which the vehicle may travel safely, and may transmit to the vehicle data defining the total number of track markers ahead of the vehicle in those blocks. The system can only cope with unidirectional train working.

GB 1 603 526 discloses a fixed block railway signalling system in which each vehicle receives data defining the block in which it is situated, the next block ahead which it may not enter and the speed of any vehicle in that block; from which the receiving vehicle may determine the speed at which it should run. In addition, provision may be made for fixed block units to give the receiving vehicle data defining the position of a vehicle ahead of it by which its limit of movement authority is restricted.

SUMMARY OF THE INVENTION

According to the present invention from one aspect there is provided a railway signalling system comprising:

control means for controlling the movements of railway vehicles on a railway track, including storage means for storing data defining physical characteristics of the railway track and the locations of the vehicles, first processing means for processing the data stored in the storage means to determine permissible movements of the vehicles, and first communication means for transmitting to the vehicles movement data defining the vehicles' permissible movements; and protection means carried by at least one of the vehicles for causing the vehicle to move under the control of the control means, comprising second communication means for receiving the said movement data relating to the vehicle, second storage means for storing geographical data defining physical characteristics of the railway track, second processing means for processing the movement data in dependence on the geographical data to determine a maximum safe operating speed for the said vehicle, and operation means for controlling the vehicle to travel at no more than the determined maximum safe operating speed.

According to the present invention from another aspect there is provided a railway signalling system comprising:

control means for controlling the movements of railway vehicles on a railway track, including first storage means for storing data defining physical characteristics of the track and the routes required to be taken along the track by the vehicles, first processing means for processing the data stored in the first storage means to determine route setting data comprising the settings of the points required to allow one of the vehicles to take its required route; and an interlocking for receiving the route setting data, including second storage means for storing location data defining the locations of the vehicles on the track and the locations of the points, second processing means for processing the setting data and the location data to determine a permissible setting of the set of points, and points control means for controlling the points to adopt the determined setting.

BRIEF DESCRIPTION OF THE DRAWINGS

The present invention will now be described by way of example with reference to the Figures, in which:

FIGS. 2A and 2B illustrate four possible routes by which a train can pass over a junction;

FIG. 3 illustrates three possible routes between two separate locations;

FIG. 4 illustrates a fixed block system;

FIG. 5 illustrates the limit of movement authority given to a train;

FIG. 6 illustrates apparatus suitable for implementing a system according to the present invention;

FIG. 7 shows a model of a train's worst case speed characteristic assumed for emergency braking;

FIG. 13 illustrates apparatus suitable for implementing a system according to the present invention.

DESCRIPTION OF THE PREFERRED EMBODIMENTS

Figure 8:
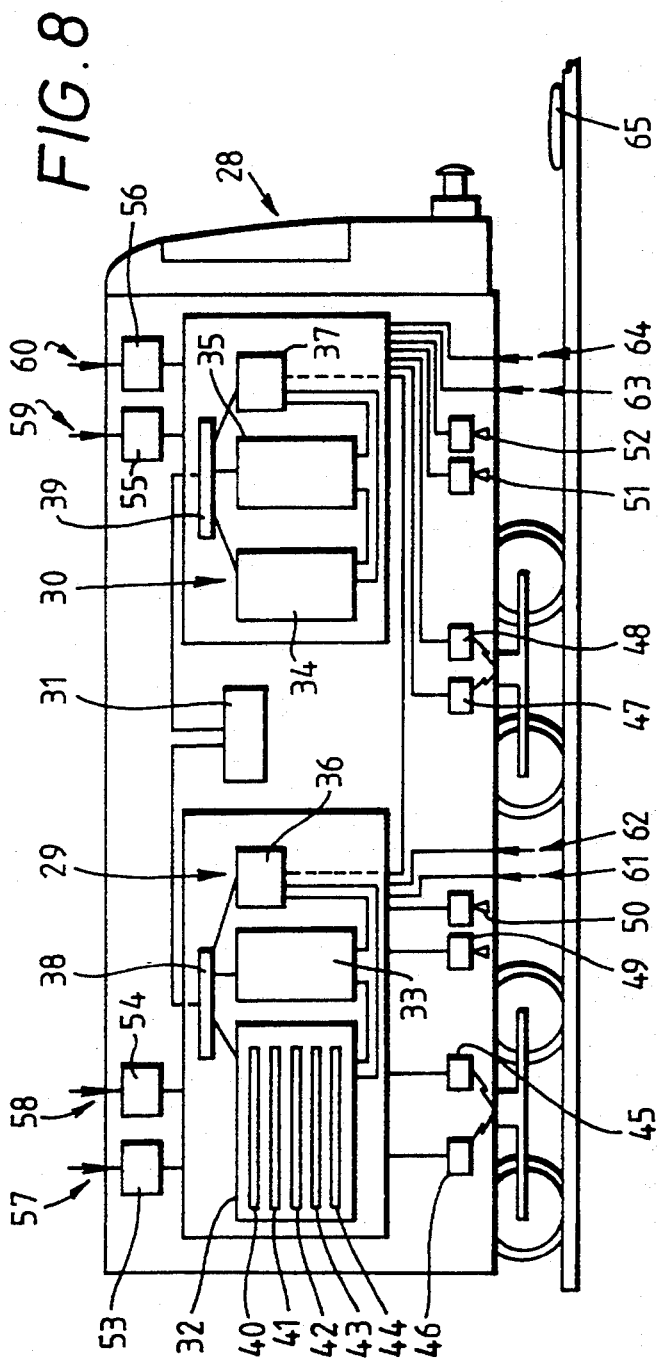
FIG. 8 shows the architecture of apparatus carried by a train.

In the system to be described, the accuracy with which the position of a train is known is improved so that a following train's movement authority may be limited by the position of a followed train. The effect is that the block boundary moves "along with the tail of the followed train. This system results in the limit of movement authority for the following train being smoothly updated with the movement of the followed train. The effect of this moving block system is illustrated generally in FIG. 5.

To operate the system, a trackside moving block processor unit ("MBP") is associated with at least one interlocking which allows the MBP to interface with trackside apparatus. There is also a train-borne system associated with each train (called the Train Carried System or TCS) which receives information from the MBP. The TCS includes an automatic train protection unit (ATP) which determines the permissible safe speed profile of the train on which it is installed, and an automatic train operation unit (ATO) which controls the train under the supervision of the ATP.

The ATP system enables trains to be driven manually or, in conjunction with the ATO, automatically with greater precision, allowing improved headway and journey time compared to conventional signalling. The ATP system operates on a moving block principle, with the train-carried ATP equipment establishing the precise location of its train. This information is then passed, via a bi-directional radio communications system (though other media may be used), to the trackside MBP where an LMA can be established for each train, indicating how far ahead the train is permitted to travel. The LMA is returned to the ATP equipment via the radio communications system. In calculating LMAs, the MBP also receives point, route and track circuit occupancy status from interlockings. The MBP is able to monitor the progress of non-equipped trains from the track circuit occupancy status and provide protection to both equipped and non-equipped trains.

FIG. 6 shows trains 10, 11, 12, each carrying a TCS which transmits and receives information to and from an MBP 13. An interlocking 14 controls signal 15 and points 16 and receives status information from those units. It also receives data from track circuit units (not shown in FIG. 6) and data from the MBP. The interlocking is connected to the MBP to transmit data from the track circuit units and information concerning the status of the points and signals to the MBP and to receive information to control the points and signals from the MBP. The interlocking includes a memory 17, a processor 18, an interface 19 for communicating with the points and signals and an interface 20 for communicating with the MBP. The MBP includes a memory 21, a processor 22, an interface 23 for communicating with the trains and an interface 24 for communicating with the interlocking.

The route management functions of the system (route setting, locking and holding levels) are provided by the interlocking, which allows moving block operation of The route management functions of the system (route setting, locking and holding levels) are provided by the successive trains along the same route through a junction. It also provides the usual lineside signals for use during the changeover phase to the new system or for operation of trains not equipped within ATP. This provides significant benefits in the form of reduced disruption to an existing train service during installation of the system and financial savings in not having to equip all rolling stock that may run on the line.

The primary safety functions are anti-collision and over-speed protection. Provision of anti-collision protection is shared between the interlocking, the MBP and the ATP. The interlocking is used to establish and lock safe routes. Once these routes have been locked by the interlocking, the MBP examines the state of the interlocking, applies a "reserve" status to it and, once this has been proved within the interlocking, generates an LMA for each train required to use that route. This LMA is generated according to moving block principles and is therefore limited by whichever of the following is closest to the train in question:

a) the reported location of the tail of the train in front;
b) the next un-reserved signal;
c) the next un-detected set of points (or floodgate, etc.);
d) the beginning of the first un-occupied track circuit behind an un-equipped train.

When an LMA has been generated and issued to an ATP the ATP determines its location, determines its emergency brake trajectory from its current speed and location to zero speed and if this trajectory violates any speed restrictions or if the stopping point (where final velocity equals zero) is equal to or further than the LMA then the ATP causes the train's emergency brakes to be applied.

The braking model used to determine this trajectory includes three stages. Stage 25 models the ATP processing time, stage 26 models the brake build up time and stage 27 estimates emergency brake performance. The predicted behaviour of the train during each of the three stages can be configured to take into account track gradients, and the algorithm used in the final braking stage can take account of velocity-related brake fade. The stages are illustrated in FIG. 7 which shows acceleration under full power during stage 25, coasting following removal of traction power and subject to gradient influence during stage 26 and full-emergency braking taking into account gradients and velocity-related brake fade during stage 27.

The deceleration during stage 27 is modelled by an expression of the form:

$$\text{braking distance} = (1+k1)(aV+bV^2+cV^4)$$

where a, b and c are train-performance related constants and k1 is a per unit safety factor.

The three-stage calculation is continually repeated. Each time an LMA is received from the MBP an ATP responds with its location which is then used by the MBP in the determination of subsequent LMAs for other trains.

MBPs are distributed throughout the railway system and are usually associated with interlockings. Each MBP relates to a region of track and controls trains in that region which have "registered" with it. Trains which are not registered with the MBP are treated as unequipped trains. The MBPs and ATPs together perform the protection function of the system, communicating with each other through a track to train radio system ("TT Comms"). Each ATP accepts, from the MBP it is under the control of, an LMA defining the point along the track and route to be taken to get there, beyond which its train cannot travel. LMAs (and speed limits) are enforced by the ATPs using brake assurance (as described above) and therefore no fixed overlap length is needed. Each ATP receives speed and distance information from its train's speed and distance measuring system (provided, for example, by tachogenerators) and information giving its position on the track from an Absolute Position Reference (APR) system which collects data from trackside beacons (described in more detail below). Each ATP can also respond to emergency stop commands from the MBP. The MBPs and ATPs together can allow operation of the train in either direction along a track (defined as direction A or B). When more than one ATP is provided on a train, the various ATPs communicate with each other to provide fault tolerance and extra integrity for the information from train-borne sensors.

Each ATP can provide several modes of operation: manned automatic (for use with the ATO); protected manual (for use without the ATO or when driver training/familiarisation is required); restricted manual (for use in depots or in case of failures); and standby (for a non-active cab). A geographic database is stored in a memory in the ATP and contains a full description of the track topography and topology as well as the area and classification of all permanent speed restrictions.

The ATP has a communicating two/three-out-of-four architecture which provides both the necessary degree of hardware safety and signal fault tolerance for high availability of the train carried protection functions. This is provided by two ATPs, one at each end of the train, each having two processing lanes. A further "half lane" in each ATP provides communication with the ATP at the other end of the train combining the output states of the remote-end ATPlanes. The safety-critical discrete outputs are combined in a simple voting arrangement to provide the train interface. The architecture is illustrated in FIG. 8, which shows a train 28 carrying two ATPs 29 and 30, communicating with an ATO 31, and each having two processing lanes 32,33 and 34,35, a "half" processing lane 36,37 and a 2-out-of-3 voting unit 38,39.

Each processing lane consists of a processor board, memory board, speed/location board, serial I/O board and parallel I/O board(shown as 40–44 respectively for lane 32). There may also be an optional track code reading module for railways equipped with coded track circuits.

Each ATP has two tachogenerators 45 and 46 or 47 and 48 and two Doppler radar speed measurement devices 49 and 50 or 51 and 52 associated with it. The outputs from these sensors are cross-coupled to the two lanes of the ATPs to ensure the safety integrity of the speed/distance measurement functions and to provide single fault tolerance within the sensors themselves.

Before operation, each ATP is configured with the speed classification (1 of 16) of the train type in which it is to be installed. Each ATP is also configured with all permanent speed restrictions (PSRs) on the railway system. This data is stored in the memory units of the ATP. PSRs may be directional and may apply to the entire length of the train or just to its leading edge. Every PSR has a track speed classification (1 of 30).

The table below gives a brief example of how train speed classification and track speed classification are interpreted together to provide the actual value of a particular speed restriction for a particular train. Train speed classification relates to the quality of the trains' handling characteristics (the higher the number the better) and track speed classification relates to the quality of the physical track (the higher the number the better). The actual speed values in the table may be determined for any particular instance of the system.

|                              | Train speed classification 1 | Train speed classification 2 | Train speed classification 3 | Train speed classification 4 |
|------------------------------|------------------------------|------------------------------|------------------------------|------------------------------|
| Track speed classification 1 | 10 kph                       | 10 kph                       | 10 kph                       | 10 kph                       |
| Track speed classification 2 | 40 kph                       | 50 kph                       | 73 kph                       | 105 kph                      |
| Track speed classification 3 | 65 kph                       | 72 kph                       | 112 kph                      | 135 kph                      |
| Track speed classification 4 | 80 kph                       | 100 kph                      | 150 kph                      | 150 kph                      |

The table is interpreted such that if a train of speed classification 2 is in or approaching a region of track speed classification 3 then the actual speed restriction applying to that train is 72 kph.

Temporary speed restrictions (TSRs) may be imposed by the MBP transmitting a TSR signal to the ATP. The ATP then acknowledges correct receipt of the TSR. This is also done when the MBP transmits a signal removing a TSR. Each ATP monitors its train's speed, allowing the train to be driven at speeds up to the applicable speed limit minus 1%, and controls the train's emergency brake in order to ensure that the train does not exceed any PSR or TSR. Where more than one speed restriction is applicable, the ATPs enforce the most restrictive. ATPs cease to impose a TSR (and discard knowledge of it) when any of the following occurs:

a) the whole length of the train leaves the area affected by the TSR;
b) an ATP becomes inactive or unregistered;
c) when informed of the removal of the TSR.

Where the ATP has applied its train's brakes due to the train exceeding a speed restriction the ATP can be configured to release the brakes under any of the following conditions, as appropriate:

a) the train's speed falls below the maximum permitted speed and the train's driver acknowledges the ATP's action to brake the train;
b) the speed has fallen below the maximum permitted speed;
c) the speed has fallen below the maximum permitted speed and the driver has acknowledged the ATP's action, unless there have been more than a predetermined number of speed trips within a previous (configurable) time interval in which case the ATP removes the emergency stop only when the train has come to a standstill and the driver has acknowledged the ATP's action;
d) only when the train has come to a standstill and the driver has acknowledged the ATP's action (this is particularly suitable where the train is operating in a "manned automatic" mode).

The APR system consists of tags or beacons ("transponders") laid at regular intervals along the railway (and closer together where a higher accuracy of location is required such as on the approaches to signals and platforms), and train mounted readers. FIG. 8 shows RF antennae 61-64 which receive signals from a beacon 65 and pass the received data to the ATPs. Each beacon is interrogated by the reader as the train passes over it and replies with its own unique identity. This identity, along with a signal indicating that a tag is currently being read, is passed to the ATP. Equipment is duplicated for safety. Each lane of the ATP has an interface to the APR system. APR tags are laid at half the interval needed for the required positional accuracy, in order to allow for a tag to be missed yet still achieve sufficient system performance and accuracy targets.

The data from trackside transponders is passed to the train's ATP within a predetermined maximum system delay time, together, if necessary, with a signal indicating the active communications window time of a transponder. The APR system can also provide a signal indicating the location of the transponder relative to a pre-defined reader axis. The APR system provides a signal to the ATP indicating when a transponder is in the RF field of the APR antenna. The time and distance offsets between this signal and the actual edge of the field are fixed and known to the ATP and the ATP uses its knowledge of these offsets together with its geographic database to determine the location of the train: it determines the rising and falling edges and knowing the time and distance offsets it can determine the location of the transponder with respect to the antenna; and knowing the location of the antenna with respect to the front of the train it can determine the train's location. The APR system can also provide a test function which can be triggered by the ATP to perform a full functional test on the reader and antenna systems. To allow this to be done a test transponder is positioned on the train in the antenna field of the APR's antenna. This transponder can be turned on by the ATP during testing.

The TT Comms system uses a broadcast or leaky feeder radio with units at the trackside to communicate with train-borne receivers 53-56 in FIG. 8 (each having one of aerials 57-60) which communicate with an ATP. The railway is divided into contiguous radio zones, each of which is allocated to the direct control of an MBP, but each trackside unit is accessible to all MBPs. The transmitting and receiving portions of the system are dual-redundant for availability. The TT Comms system allows different messages to be transmitted in different communications zones controlled by a single MBP or alternatively it can allow the same message to be broadcast over more than one communications zone, either controlled by a single MBP or by multiple MBPs, although not necessarily both in the same time frame. The TT Comms system controls the change of operating transmit and receive frequencies of the train-borne equipment when the train crosses communications zone boundaries. Both the trackside and train-borne components of the TT Comms system send normal priority messages in FIFO order. The trackside component of the TT Comms system can set an 'Emergency Stop' bit in all its messages any or all of the trains within a communications zone to command those trains to emergency stop if necessary. The trackside component of the TT Comms system periodically transmits a 'Registration Available' message, including the current system time, to all trains.

Figure 9:
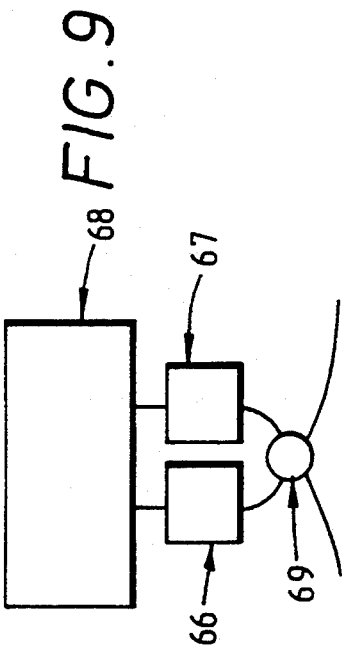
FIG. 9 illustrates track-side communications apparatus.

The trackside component of the TT Comms system transmits a message in every available communications slot. If no normal message needs to be sent a dummy message is sent which is valid but has no significant data. The trackside system is shown in FIG. 9 and comprises duplicate base transceivers 66,67 communicating with an MBP 68 and transmitting and receiving to and from a leaky feeder splitter/combiner unit 69.

Each MBP stores information on the physical features of its region of track and on the status of trains, signals and points in the region. This information is used to provide LMAs and TSRs. An LMA may restrict the distance which a train is authorised to travel. The train positions transmitted to the MBP by ATPs are supplemented by information on train positions which the MBP receives from trackside train detection units. Each MBP also communicates with the MBPs controlling adjacent regions off track (to pass information on trains passing from one region to another), and with one or more control terminals (70 in FIG. 6) which can display information received from the MBP (to monitor its performance) and can transmit information to the MBP (to alter speed limits for example).

Figure 10:
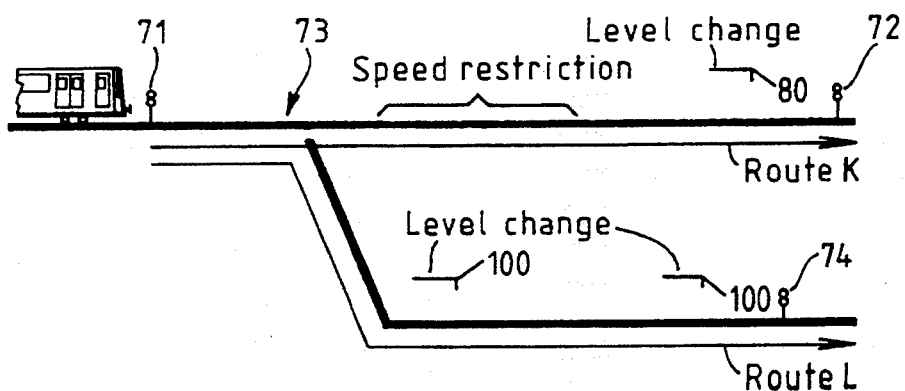
FIG. 10 illustrates possible limits of movement authority given to a train by the system.

To determine the maximum speed at which a train may travel, the system should be aware of, for example, speed restrictions, gradients and the settings of signals on the railway. To set limits of movement authority for a train approaching a junction, the system should be aware of the setting of the points at the junction; this allows the system to determine which way the train will go at the junction and therefore to consider the features of the railway along the route which the train will take. Even if there is no other train about, the system must still be aware of which route a train is to take because the alternative routes may be of different lengths or have different gradients or speed restrictions applying to them, as shown in FIG. 10, where alternative routes K and L require different limits of movement authority.

In this case, the system would detect that route K, from signal 71 to signal 72, is required, by detecting that points 73 are set to allow travel between signals 71 and 72 and that signal 71 is activated; and hence the system would determine an LMA up to signal 72 rather than signal 74.

Figure 11:
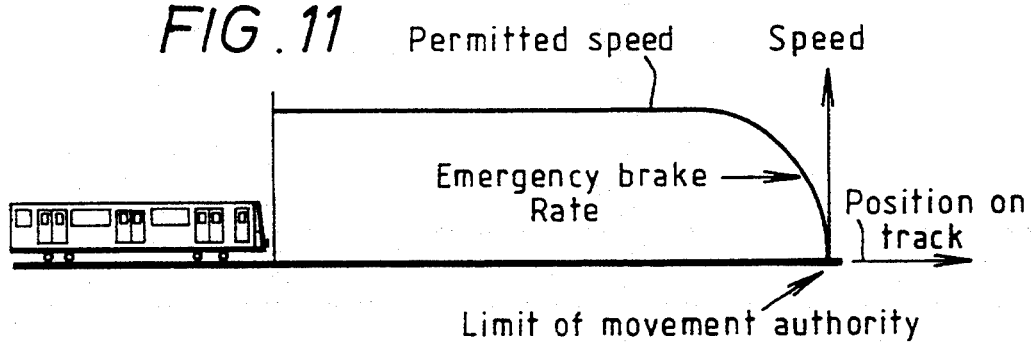
FIGS. 11 and 12 illustrate movement authority profiles allocated by the system.

Once a train's ATP has received from the MBP information defining that train's limit of movement authority it can, knowing the train's current location, the train's worst case guaranteed braking performance and the geography of the route ahead of it up to the LMA, calculate a safe running profile of location versus permitted speed. Should the train at any time exceed this profile then the brakes will be applied to slow the train. An example of a simple running profile is shown in FIG. 11.

Figure 12:
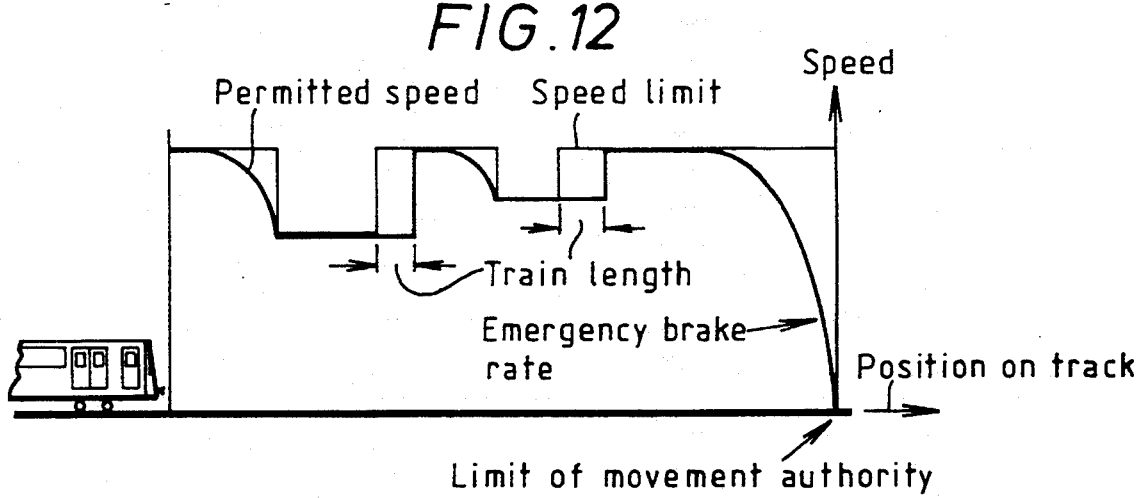

If the route geography data also includes the location and value of all speed restrictions then these may be taken into account in calculating the safe running profile for the train. It is necessary to ensure that this speed limit is not exceeded by any part of the train and so the location at which the train may return to maximum line speed must take into account also the length of the train. This is represented in FIG. 12 which shows a more complex running profile.

To cause the MBP to transmit signals to it, a train's ATP must "register" with the relevant MBP by transmitting a registration signal to it. After registration, the train is operated in a "protected mode" where it communicates with the MBP to ensure that it is moving safely.

Each MBP receives two types of signal from interlockings:
 a) controlled signals—these control access of trains to sections of track; and
 b) uncontrolled signals—these include repeat aspects, signals on auto sections and any signals that do not relate to the status of a section of track.

Each MBP maintains a 'valid move' status for all trains within its area. This status indicates whether, as far as the relevant interlocking is concerned, it is acceptable for the train to proceed to the next controlled signal (along the path currently set defined by the points ahead of the train). Whether an MBP considers a move to be valid is determined with regard to the following conditions:
 a) If there was a call on the last controlled signal when the train went past it then the MBP considers the move to be valid.
 b) A call on a controlled signal sets the valid move status for all trains up to the next controlled signal in the current direction, and the move status is set to invalid for trains travelling in the opposite direction. By this method a train's move can be made valid if a train has got into a position where its move would normally not be valid, e.g. if it turns round too far away from a signal for condition c) below to make the move valid, or after a power failure.
 c) The front of the train is within a predetermined distance of the next signal, This distance must be such that irrespective of how the train got to its current location it is safe to give it an LMA up to the signal. This distance may span a boundary into the next MBP's region of control.

A 'valid move' status is maintained for all trains, whether or not they have registered with an MBP, so that a train which has not registered with the MBP can register and then proceed in protected mode without the need for the route it is currently on to be called again. The 'valid move' status associated with a train is directional since it is associated with the train moving from one signal to the next.

The sequence of events for a protected mode train approaching a controlled signal (or points) is:
 a) When the LMA of a train reaches a signal and there is a call on the signal the MBP recognises that it is acceptable for the train to continue past the signal.
 b) The MBP then regards the signal as having 'Reserved' status. This is an approach lock under the control of the MBP (the interlocking's approach locking is still overridden).
 c) When the MBP recognises a reserve active status from the interlocking the MBP allows the LMA of the train to advance forward.
 d) When the front of the train passes the signal (and the first track circuit past the signal is detected as being occupied) the MBP releases the reserve on the route. The route holding in the interlocking will maintain the route.

This procedure is to avoid the signal (or points) being changed when the train is so close to the signal that it could not stop before reaching it.

The MBP is configured to recognise a signal call in one of the following three ways. Each signal is separately configurable.

a) A transition from uncalled to called must be seen by the MBP since the front (worst case backwards) of the last train went past the signal.
b) The called status is currently active when required.
c) The call can be assumed since the route is only ever operated in one direction and has no conflicting route.

The MBP monitors each reserved signal. If the call is removed the MBP causes the train for whom the signal was reserved to make an emergency stop. This can result in the following situations:

a) The train stops short of the signal and then the reserve is lifted. In this case the train can be given a signal to cancel the emergency stop and its LMA can be advanced up to the signal.
b) The train passes the signal (either partly or completely) while stopping. In this case the train move is 'not valid' and so a 'protected modes not available' signal must be sent to the train before the emergency stop can be cancelled. The move status of the train must then be made valid before the train can be allowed to operate in protected mode in the normal manner.

If a route reserve is not acknowledged within a predetermined time the MBP assumes that the locking in the interlocking has failed, removes the reserve request and reports a fault. If a route for which a reserve fault has been reported is called again the MBP attempts to reserve it again.

If an MBP detects a route component ahead of a protected train becoming unlocked, the MBP does not allow the LMA of the train to pass that component until the detection has returned. The interlocking looks after maintaining the detection when loss of detection is acceptable (i.e. when trains are over the detectors) and establishing when it is acceptable for detection to be re-established, so when detection is seen again the MBP can allow a train over it.

If an MBP detects a route component (e.g. points) ahead of a protected train becoming unlocked and the LMA for the train extends past that route component then the MBP sends an 'Emergency Stop' message to the train's ATP. This can be cleared under the following conditions:

a) If the train stops short of the failed component then the emergency stop can be cleared and the train given an LMA up to the points (the MBP will be reporting the current limit on the LMA as the failed component).
b) If the train gets over the failed component then protected mode will become unavailable and the emergency stop cleared.
c) If the detection failure clears then the emergency stop is cleared and the train allowed to continue (in this case the train will not necessarily come to a halt).

If the MBP determines that the interlocking route holding may be lost then it causes the train to make an emergency stop, sets protected mode for the train to be unavailable and then clears the emergency stop. It detects this by all of the following becoming true:

a) no track circuits under the train indicate occupancy (due to wrong side detection section failures);
b) there is not a call or reserve on a route which will hold the route; and
c) there are not any track circuits occupied behind the train on the same route (by another train).

Only one MBP generates an LMA for a train at any one time. That MBP is in control of the train. An MBP takes control of a train either when the train registers within the MBP's area of control or when control is passed to the MBP from an adjacent MBP. However, an MBP can issue an emergency message to any train irrespective of whether or not that MBP is in control of the train. This will normally be an 'Emergency Apply TSR' or an 'Emergency Stop Request' signal arising because something has happened between the back of the train and the edge of the area which that MBP controls. (At that time the LMA for the train will be being generated by another, adjacent MBP).

When a train within an MBP's region of control gets close to the boundary of the MBP's region of control, the MBP issues a 'Start Session for Train' message to the MBP controlling the region at the other side of the boundary. A protected train is deemed to be close to the boundary when its LMA reaches the boundary (but has not been confirmed by the train). Once an MBP has received confirmation that a protected train has received an LMA up to the boundary of the MBPs region of control, the MBP issues a 'Take Control of Train' message to the MBP in control of the region on the other side of the boundary. When an MBP receives a 'Take Control of Train' message, but is already controlling the maximum of trains that it can, the MBP returns an 'Unable to Take Control of Train' message to the MBP still in control of the train. On receipt of a 'Unable to Take Control of Train' message an MBP waits for a predetermined period of time before again attempting to pass control to the adjacent MBP. When all of a train has left an MBP's area of control, that MBP issues a 'Close Session for Train' message to the MBP into whose area of control the train has moved. If an MBP identifies that a train is no longer going to cross the boundary to an adjacent MBP, it issues an 'Abort Session for Train' message to the other MBP.

Each MBP monitors the locations of TCS-equipped trains to the higher resolution available using their reported locations. In addition, each MBP cross-checks these reported locations with the detected train locations received from the interlockings.

An MBP provides all registered unprotected trains with a 'divergence message' when the train approaches a point of divergence in restricted manual or unprotected reverse modes.

An MBP can determine which way a train is going by monitoring the state of the points ahead of the train. This mechanism means that the ATP should always know where the train is when it is in communication with the MBP, except when there is loss of detection on a set of points until the train is detectable by track circuits or until the ATP passes a transponder and reports its train's location to the MBP. This location report can be one of the following:

a) When a train's ATP knows the actual location of the front of the train it reports the identity of the segment of the railway in which it lies and the train's offset into the segment.
b) When a train's ATP does not know which way it has gone at a divergence it will report the identity of the segment immediately before the divergence and the distance travelled since the segment boundary. At this point the train's front end is considered as having two possible locations. If the train passes a second divergence then the train's front end is considered as having three possible locations, etc.

All these locations are at the distance from the end of the last segment the train it knew it was in that the train has travelled since leaving that segment. When the train re-establishes its actual location (by reading a transponder or by the MBP giving it route divergence) then it reverts to reporting actual location (see below).

If an MBP loses communication with an ATP it reverts to information received from its interlockings for monitoring the train's location.

The form of the interface between each interlocking and an MBP varies depending on the type of the interlocking. A section of plain line uni-directional track that does not have a physical interlocking system associated with it (since it effectively has one permanently set route) may merely have a conceptual interlocking. A mechanical interlocking could have detectors to sense the state of the necessary levers and points whilst a relay interlocking could have wires to detect the state of the necessary relays. These two configurations require a "parallel" interface to the MBP. An electronic interlocking could have a serial interface added to it to interface to the MBP. To perform its function an interlocking needs to know the positions of trains (but not to the same resolution as the MBP) and so the MBP may, in some applications, report a "processed" version of train position to the interlocking in terms that the interlocking can deal with. This may be in terms of "pseudo track section" occupancy.

Depending on the operating principle of the interlocking (which may be either the "unit lever" principle, where points and signals are activated individually in the correct sequence to establish a route, or the "route call" principle, where a particular route is requested and the operation of points and signals is managed within the interlocking), the MBP will detect the lay of points and detect which is the requested route entry location (for unit lever) or detect the establishment of the requested route (for route call). The MBP is aware of the location of all trains and can hence determine which is the nearest obstacle to each train. If an MBP fails, the interlocking may provide basic back-up signalling. If required, the interlocking can provide back-up signalling, for use by trains unequipped with a TCS or if the normal communication system fails.

An MBP and TCS use the concept of a section to describe an area of track. A section is defined by all of its edge points; each edge point is described by a location (segment and offset) and the direction (with respect to the positive direction of the segment) into the section at that point.

An MBP considers protected manual and manned automatic train operating modes to be the same. These are referred to as protected mode.

Where a railway runs trains that are not equipped with the TCS then some other form of train detection is required. This may take the form of, for example, track circuits or axle counters, which are used in the industry as parts of existing signalling systems. The interlockings act as interfaces between these and the MBPs. The MBPs determine that an occupied section of track, with no corresponding train location reported from a TCS, represents one of the un-equipped trains and hence that the boundary of the occupied section is the nearest obstruction to a particular train. This section boundary then restricts the LMA of an equipped train until that section becomes clear. The MBP transmits TSRs but not LMAs to un-equipped trains.

This is illustrated in FIG. 13. FIG. 13 shows a train 75, which is equipped with a TCS, following a train 76, which is not equipped with a TCS. The track is divided into block sections 77-81, each with train detection means such as track circuits 82-86 which pass information on whether a block section is occupied by a train to an MBP 87 via an interlocking 88. The MBP can then determine that block section 80 is occupied and that the limit of movement authority 89 for the following train 75 extends only to the boundary of that occupied block section.

In this way it is possible to overlay a new moving block system on to an existing railway while being able to operate both equipped and un-equipped trains to give the benefits of increased capacity that moving block operation provides. The existing signalling system complete with track circuits, axle counters, position detectors, line-side signals and the like can be retained intact for the operation of un-equipped trains while equipped trains run to the higher capacity under moving block operation.

Alternatively, in a new installation, only those items of equipment necessary to run the envisaged train types need to be included, the minimum set of equipment being points machines with detection, an interlocking of some kind and the system generally described herein.

I claim:

1. A railway signalling system comprising:

control means for controlling the movements of railway vehicles on a railway track, including storage means for storing data defining physical characteristics of the railway track and the locations of the vehicles, first processing means for processing the data stored in the storage means to determine permissible movements of the vehicles, and first communication means for transmitting to the vehicles movement data defining the vehicles' permissible movements; and protection means carried by at least one of the vehicles for causing the vehicle to move under the control of the control means, comprising second communication means for receiving the said movement data relating to the vehicle, second storage means for storing geographical data defining physical characteristics of the railway track, second processing means for processing the movement data in dependence on the geographical data to determine a maximum safe operating speed for the vehicle, and operation means for controlling the vehicle to travel at no more than the determined maximum safe operating speed.

2. A railway signalling system as claimed in claim 1, wherein the geographical data is stored in the second storage means prior to operation of the vehicle.

3. A railway signalling system as claimed in claim 1, wherein the movement data defines a location along the track beyond which the said vehicle is not authorised to travel.

4. A railway signalling system as claimed in claim 1, wherein operational data defining the operational characteristics of the vehicle is stored in the second memory means, and the second processing means determines the operating speed in dependence on the operational data.

5. A railway signalling system as claimed in claim 1, wherein the geographical data includes data defining the gradient of the track at a plurality of locations.

6. A railway signalling system as claimed in claim 1, wherein the operation means controls a function selected from the group consisting of the brakes and traction system of the said vehicle.

7. A railway signalling system as claimed in claim 1, wherein the first and second communication means communicate by radio.

8. A railway signalling system as claimed in claim 1, wherein the system includes a plurality of transponders spaced apart along the track for transmitting location signals to the vehicles.

9. A railway signalling system as claimed in claim 8, wherein the second processing means processes the location signals to determine the location of the vehicle.

10. A railway signalling system as claimed in claim 9, wherein the determined location is transmitted to the control means via the second communication means.

11. A railway signalling system as claimed in claim 1, wherein the system includes vehicle detection means situated along the track for detecting the locations of vehicles along the track and producing location signals in dependence on those locations.

12. A railway signalling system as claimed in claim 11, wherein the vehicle detection means comprises detection equipment selected from the group consisting of a track circuit unit and axle counter.

13. A railway signalling system as claimed in claim 11, wherein the system includes an interlocking for receiving the location signals and transmitting to the control means data defining the detected locations.

14. A railway signalling system as claimed in claim 1, wherein the vehicle includes speed sensing means for detecting its speed and transmitting this to the protection means.

15. A railway signalling system as claimed in claim 1, wherein the system comprises a plurality of the said control means each controlling the movements of trains in a predetermined region of the railway.

* * * * *

(12) REEXAMINATION CERTIFICATE (4666th)
United States Patent
Newman

(10) Number: US 5,437,422 C1
(45) Certificate Issued: Nov. 5, 2002

(54) RAILWAY SIGNALLING SYSTEM

(75) Inventor: Gregory D. Newman, Chippenham (GB)

(73) Assignee: Westinghouse Brake and Signal Holdings Limited, Chippenham (GB)

Reexamination Request:
No. 90/005,858, Nov. 15, 2000

Reexamination Certificate for:
Patent No.: 5,437,422
Issued: Aug. 1, 1995
Appl. No.: 08/015,144
Filed: Feb. 9, 1993

(21) Appl. No.: 08/015,144

(30) Foreign Application Priority Data

Feb. 11, 1992 (GB) .............................................. 9202830

(51) Int. Cl.[7] ................................................ B61L 27/04
(52) U.S. Cl. ..................... 246/5; 246/182 R; 246/187 A

(56) References Cited

FOREIGN PATENT DOCUMENTS

| DE | 1 176 698 | 6/1967 |
| DE | 1 455 379 | 1/1976 |
| DE | 16 05 430 | 1/1976 |
| DE | 37 07 497 | 9/1987 |

OTHER PUBLICATIONS

Y. Hasegawa, "innovative Train Control System by Radio", Quarterly Report to the Railway Technical Research Institute, vol. 30, No. 4, 1989, p. 181–189.

H. Appel, Computer Controlled Continuous Automatic Train Running According to the "Lorenz" System in Trials on the Bremen–Hamburg Line, Draht 66, 1974, p. 202–208.

B. Stamm, "A New ATC–System for Suburban and Regional Railways", Aspect Conference, 1991, p. 171–181.

Y. Hasegawa, "A New Control System by Radio", 39th Vehicular Technology Conference, vol. II, 1989, p. 851–859.

H. Uebel, "Transmission Based Train Control Systems", Aspect Conference 1991, p. 166–170.

H. Inage et al., "A Laboratory Prototype for a New Train Control System by Radio", Aspect Conference 1991, p. 311–322.

*Primary Examiner*—Mark T. Le

(57) ABSTRACT

A railway signalling system comprising a control device for controlling the movements of railway vehicles on a railway track. The system includes a memory for storing data defining physical characteristics of the railway track and the locations of the vehicles, a first processor for processing the data stored in the memory to determine permissible movements of the vehicles, and a first interface for transmitting to the vehicles movement data defining the vehicles' permissible movements; and a protection unit carried by at least one of the vehicles for causing the vehicle to move under the control of the control device, comprising a second interface receiving the movement data relating to the vehicle, a second memory for storing geographical data defining physical characteristics of the railway track, a second processor for processing the movement data in dependence on the geographical data to determine an operating speed for the vehicle, and an operation unit for controlling the travel of the vehicle at the determined operating speed.

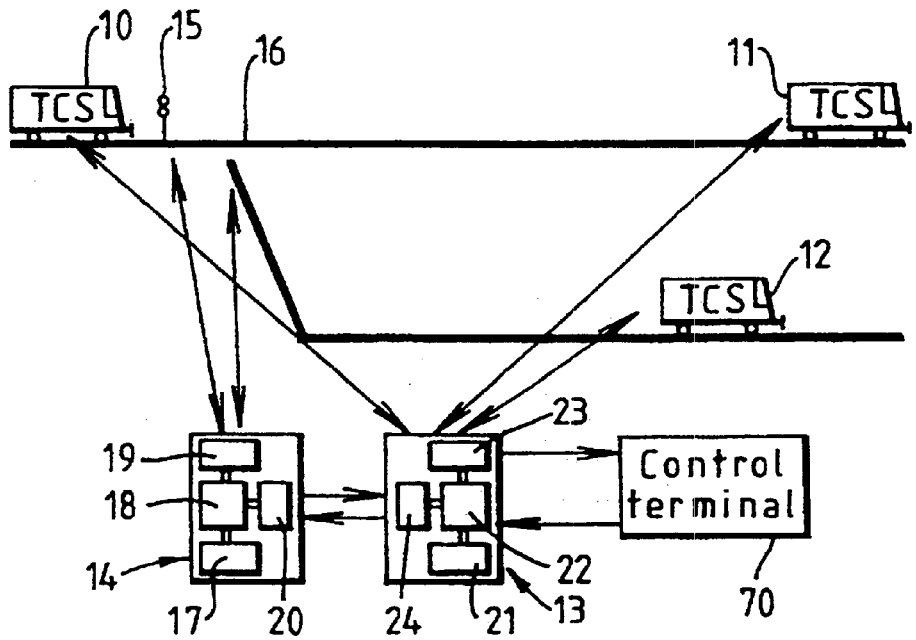

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–15 are cancelled.

New claims 16–28 are added and determined to be patentable.

16. *A railway signaling comprising:*
*control means for controlling the movements of railway vehicles on a railway track divided into block sections, the control means including storage means for storing data defining physical characteristics of the railway track and the locations of said vehicles, first processing means for processing the data stored in the storage means to determine for each of said vehicles a limit of movement authority, which defines a point along the track beyond which the vehicle is not authorized to proceed, and first communication means for transmitting to each of said vehicles movement data defining the limit of movement authority of the vehicle; and protection means carried by each of said vehicles for causing the vehicle to move under the control of the control means, comprising second communication means for sending information giving the location of the vehicle to the control means and for receiving said movement data relating to the vehicle, second storage means storing geographical data defining physical characteristics of the railway track, second processing means for processing the movement data in dependence on the geographical data to determine a maximum safe operating speed for the vehicle and operation means for controlling the vehicle to travel at not more than the determined maximum safe operating speed, wherein:*
*said system is adapted so that it is also suitable for operating further vehicles which do not carry such protection means, the system including an interlocking for controlling line-side signals and means for detecting the occupancy of a block section by a vehicle and for sending the corresponding information via the interlocking to said control means, the control means being adapted:*
*(i) to determine that if a section of track is occupied by a vehicle but there is no corresponding vehicle location information from such protection means, then the vehicle is such a further vehicle which does not carry such protection means; and*
*(ii) to determine that, in the event that such a first-mentioned vehicle carrying such protection means is following such a further vehicle, said point along the track beyond which the first-mentioned vehicle is not authorized to proceed is at the boundary of the section occupied by the further vehicle.*

17. *A system as claimed in claim 16, wherein said means for detecting the occupancy of a block section by a vehicle includes track circuits which define said block sections.*

18. *A system as claimed in claim 16, wherein for each of the first-mentioned vehicles, said limit of movement authority further defines the route for the first-mentioned vehicle to reach said point beyond which the first-mentioned vehicle is not authorized to proceed.*

19. *A railway signaling system as claimed in claim 16, wherein the protection means of each of the first-mentioned vehicles includes means for storing the geographical data in the second storage means prior to operation of the first-mentioned vehicle.*

20. *A railway signaling system as claimed in claim 16, wherein operational data defining the operational characteristics of each of the first-mentioned vehicles is stored in the second storage means of the first-mentioned vehicle, and the second processing means determines the operating speed in dependence on the operational data.*

21. *A railway signaling system as claimed in claim 16, wherein the geographical data includes data defining the gradient of the track at a plurality of locations.*

22. *A railway signaling system as claimed in claim 16, wherein the operation means of each of the first-mentioned vehicles controls a brake traction system of the first-mentioned vehicle.*

23. *A railway signaling system claimed in claim 16, wherein the first and second communication means communicate by radio.*

24. *A railway signaling system as claimed in claim 16, wherein the system includes a plurality of transponders spaced apart along the railway track for transmitting location signals to the first-mentioned vehicles.*

25. *A railway signaling system as claimed in claim 24, wherein the second processing means of each of the first-mentioned vehicles processes the location signals to determine the location of the first-mentioned vehicle.*

26. *A railway signaling system as claimed in claim 25, wherein the determined location of each of the first-mentioned vehicles is transmitted to the control means via the second communication means of the first-mentioned vehicle.*

27. *A railway signaling system as claimed in claim 16, wherein each of the first-mentioned vehicles includes speed sensing means for detecting its speed and transmitting this to the protection means of the first-mentioned vehicle.*

28. *A railway signaling system as claimed in claim 16, wherein the system comprises a plurality of said control means each controlling the movements of vehicles in a predetermined region of the railway.*

\* \* \* \* \*